(12) United States Patent
Girondi

(10) Patent No.: US 9,216,373 B2
(45) Date of Patent: Dec. 22, 2015

(54) FILTERING UNIT

(75) Inventor: Giorgio Girondi, Mantova (IT)

(73) Assignee: UFI INNOVATION CENTER S.R.L., Ala (TN) (IT)

( * ) Notice: Subject to any disclaimer, the term of this patent is extended or adjusted under 35 U.S.C. 154(b) by 27 days.

(21) Appl. No.: 14/357,282

(22) PCT Filed: Sep. 12, 2012

(86) PCT No.: PCT/IB2012/001781
§ 371 (c)(1),
(2), (4) Date: May 9, 2014

(87) PCT Pub. No.: WO2013/057549
PCT Pub. Date: Apr. 25, 2013

(65) Prior Publication Data
US 2015/0265960 A1    Sep. 24, 2015

(30) Foreign Application Priority Data
Oct. 17, 2011  (IT) .............. RE2011A0084

(51) Int. Cl.
*B01D 50/00* (2006.01)
*B01D 45/16* (2006.01)
*B01D 46/00* (2006.01)
*B01D 46/24* (2006.01)
B01D 53/22 (2006.01)
B01D 63/14 (2006.01)
B01D 65/08 (2006.01)

(52) U.S. Cl.
CPC .............. *B01D 50/002* (2013.01); *B01D 45/16* (2013.01); *B01D 46/0045* (2013.01); *B01D 46/2407* (2013.01); *B01D 46/2411* (2013.01); B01D 53/22 (2013.01); B01D 63/14 (2013.01); B01D 65/08 (2013.01); B01D 2313/04 (2013.01); B01D 2313/08 (2013.01); B01D 2315/08 (2013.01); B01D 2319/04 (2013.01); B01D 2321/2016 (2013.01)

(58) Field of Classification Search
CPC .. B01D 46/2411; B01D 50/002; B01D 63/06; B01D 2313/02; B01D 2313/08; B01D 46/2407; B01D 45/16; B01D 46/0045; B01D 2319/04; B01D 2313/04; B01D 53/22; B01D 2315/08; B01D 63/14; B01D 65/08
USPC .............. 55/337, 456, 457, 449, 498; 95/270; 210/304, 321.6, 321.87
See application file for complete search history.

(56) References Cited

U.S. PATENT DOCUMENTS

| | | |
|---|---|---|
| 3,402,529 A | 9/1968 | Frantz |
| 3,768,660 A | 10/1973 | Block |
| 4,303,423 A | 12/1981 | Camplin et al. |
| 4,964,898 A | 10/1990 | Toda |
| 5,320,652 A * | 6/1994 | Akel et al. ............ 55/320 |
| 5,575,904 A | 11/1996 | Suzuki |
| 6,958,083 B1 | 10/2005 | Schmitz et al. |
| 2007/0163941 A1 | 7/2007 | Kopp et al. |

* cited by examiner

*Primary Examiner* — Dung H Bui
(74) *Attorney, Agent, or Firm* — Volpe and Koenig, P.C.

(57) ABSTRACT

A filtering cartridge (2), intended to be contained within an outer casing (TO) provided with an inlet (11) and an outlet (12) so as to filter the fluid which flows from the inlet (11) towards the outlet (12), the filtering cartridge (2) comprising at least one filtering membrane (40), characterized in that it comprises at least one tubular body (30) into which said filtering membrane (40) is fitted so as to be at least partly wound, the tubular body (30) comprising at least one fin (32) having helical development deriving from the internal wall of the tubular body (30).

8 Claims, 3 Drawing Sheets

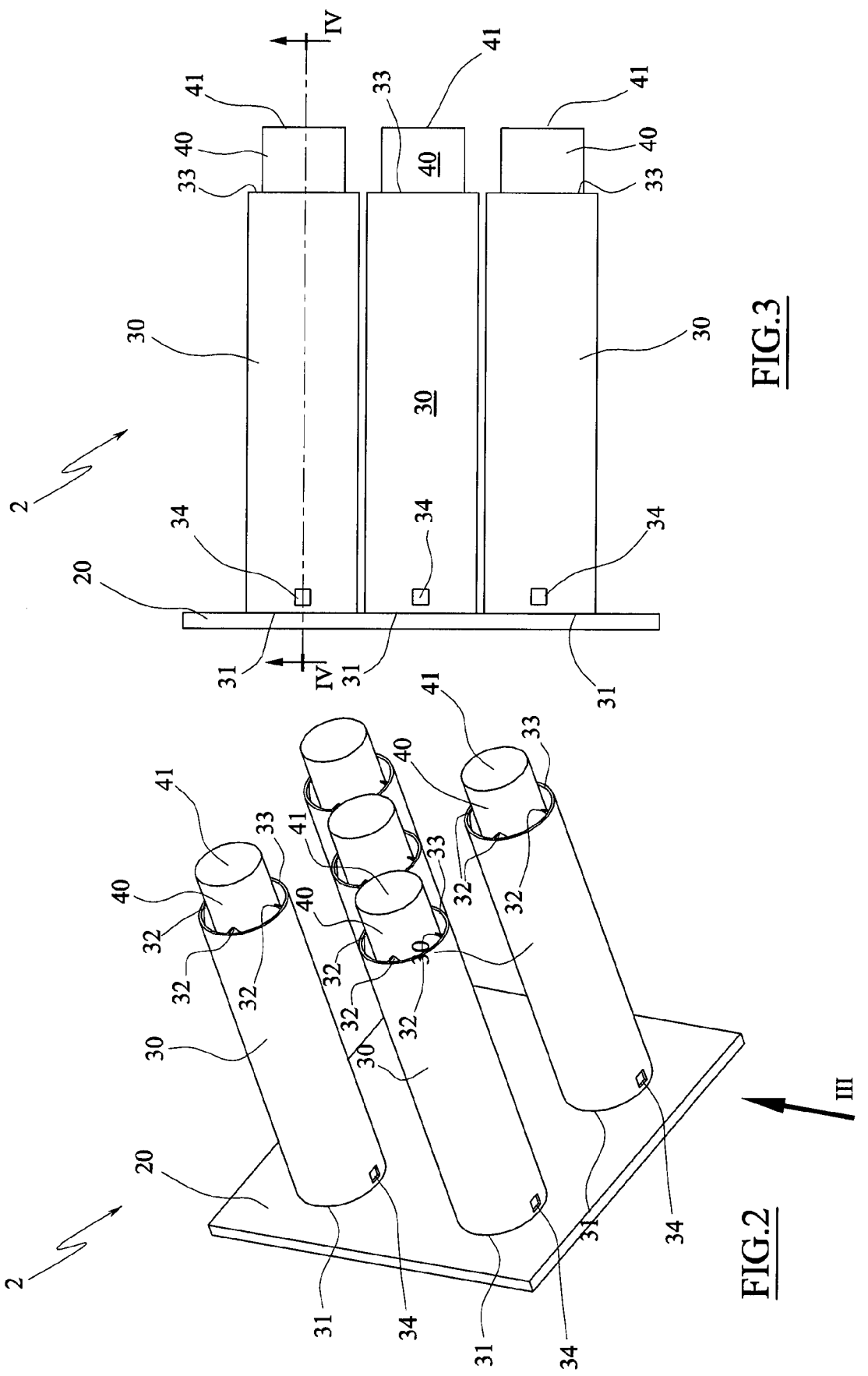

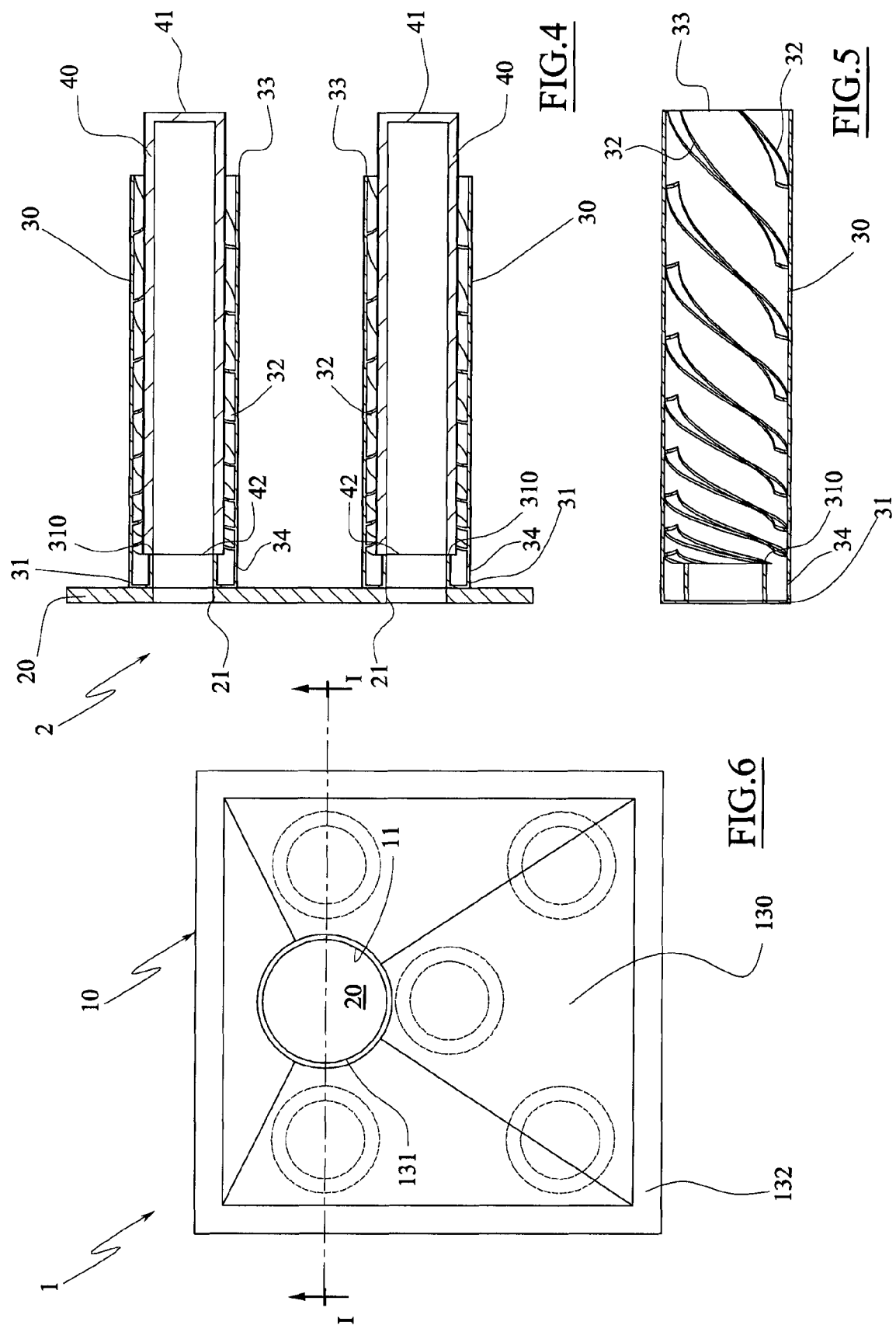

FILTERING UNIT

FIELD OF THE INVENTION

The present invention generally regards filtering fluids, especially filtering motor-vehicle fluids, particularly including filtering the air which is intaken by an internal combustion engine.

PRIOR ART

As known, air (or generally gases), which is intaken by an internal combustion engine is commonly subjected to a filtering step aimed at purifying it from the solid particles in suspension, typically powders of various types, so that the latter do not reach the engine combustion chamber. This filtering stage is typically executed through a special filtering unit, which is located along the intake conduit of the internal combustion engine, upstream of the intake manifold and the turbocharger if present.

The filtering unit schematically comprises an outer casing, usually called filtering box, which is provided with an inlet for the air to be filtered and an outlet of the filtered air, and a filtering cartridge housed within said filtering box for filtering the air which flows from the inlet towards the outlet. The filtering cartridge comprises at least one filtering material element, for example based on cellulose or polymer material, and at least one support plate for said filtering material element. The support plate is coupled to the filtering box so that the filtering material element is adapted to divide the internal volume thereof in two separate chambers, including a first chamber communicating with the inlet and a second chamber communicating with the outlet. Thus, the air which flows from the inlet towards the outlet of the filtering box is forced to traverse the filtering material element, which withholds the solid particles in suspension. Given that said solid particles progressively obstruct the filtering material element, it is commonly provided for that the filtering cartridge can be removed from the filtering box, so as to replace it when the filtering material element is excessively clogged.

One of the main needs related to this type of filtering units consists in providing filtering cartridges which maintains a high filtering capacity over time, i.e. capable of guaranteeing a high useful life and thus such to reduce the interventions for replacement thereof.

Filtering units having filtering membranes to which there are combined centrifuge systems for separating the most coarse solid particles, which are arranged in the first chamber which is communication with the inlet of the filtering unit were proposed with the aim of meeting this need.

The American U.S. Pat. No. 4,303,423 for example discloses an air filter whose outer casing defines an internal environment, within which there is inserted a substantially toroidal filtering membrane positioned so as to divide such environment in a first chamber communicating with the inlet for the air to be filtered and a second chamber in connection with the outlet of the filtered air. On the upper wall of the casing there are made holes, provided with deflector fins, such holes defining the inlet of the aria. The fins are, in particular, adapted to impart a helical motion to the air within the casing.

Furthermore, the internal wall of the casing has one or more propellers which extend over the entire longitudinal extension of the casing so as to accentuate the windmill motion imparted to the air within the first chamber of the casing.

The windmill motion imparted by the fins and by the propeller, allows pre-separating—from the air which enters into the first chamber—the heaviest fraction of solid impurities before traversing the filtering membrane, preventing such particles from clogging the filtering membrane prematurely. Then, in proximity of the bottom of the casing there is provided a hole with a fan for discharging the solid impurities which are separated in the chamber upstream of the filtering membrane due to the centrifuge action imparted to the air.

Though increasing the life of the filtering cartridge, this technical solution reveals the drawback lying in the fact that, if used with high air flow rates, it would require a considerable increase of the dimensions of the filtering membrane (outer diameter, inner diameter, height) and the dimensions of the first chamber and the height of the propeller, so as to house large amounts of solid impurities that accumulate at the propeller; all this would lead to a high overall dimension of the filtering unit and a low pre-separation efficiency of the solid fraction of the impurities present in the air to be subjected to filtering.

Furthermore, a further drawback regarding the filtering units with centrifuge pre-filtration action of the known type lies in the fact that the shape and dimensions of the casing are bound to the desired centrifuge effect, hence the outer casing will always be substantially cylindrical-shaped and, should there arise the need for filtering large air flow rates, it will have considerable overall dimensions.

Thus, this implies that such type of filtering units are hardly used in automotive industry applications in which the casing of the filtering unit must, due to needs regarding overall dimensions within the engine compartment of the vehicle, have complex configurations or are required to be small in size.

An object of the present invention is to overcome the aforementioned drawbacks of the prior art, through a simple, rational and inexpensive solution.

These objects are attained by the characteristics of the invention indicated in the independent claim. The dependent claims outline preferred and/or particularly advantageous aspects of the invention.

DESCRIPTION OF THE INVENTION

In particular, the invention provides a filtering cartridge, intended to be contained within an outer casing provided with an inlet and an outlet so as to filter the fluid which flows from the inlet towards the external, the filtering cartridge comprising at least one filtering membrane, characterised in that it comprises at least one tubular body into which said filtering membrane is fitted so as to be at least partly wound, the tubular body comprising at least one fin having helical development deriving from the internal wall of the tubular body.

Due to this solution, the filtering capacity of the filtering cartridge is independent from the dimensions and from the shape the casing of the filtering unit into which it is inserted.

Furthermore, an aspect of the present invention provides for that the fin be provided with a height substantially equivalent to the difference between the inner diameter of the tubular body and the outer diameter of the filtering membrane.

Thus, the height of the fins can be dimensioned so as to optimise the collection of solid particulate, as a function of the air flow rate traversing the filtering cartridge.

An aspect of the invention provides for that the fin be provided with a variable pitch along the longitudinal axis of the tubular body.

This solution allows optimising the path and the speed of the air before it traverses the filtering membrane, so as to improve the separation of the coarse solid part from the air to be subjected to filtration.

Still another aspect of the invention provides for that the filtering membrane be provided with a closed end and an open opposite end.

Advantageously, the tubular body comprises at least one annular abutment adapted to be fixed to the open end of the filtering membrane so as to divide the environment within the filtering membrane from the external environment thereby.

This solution allows providing an obligatory passage for the air which guarantees an efficient centrifuge separation of the coarse solid particulate and an efficient filtration through the filtering membrane.

A further aspect of the invention provides for that the tubular element comprises at least one discharge gap on the lateral wall thereof.

This solution allows discharging, outside the tubular body, the separated solid particulate due to the centrifuge action from the fin of the tubular body.

Furthermore, an aspect of the present invention provides for that the filtering cartridge comprises a plurality of filtering membranes and a plurality of respective tubular bodies, each of which is associated to the support element at a respective hole made therein.

Due to this solution, the filtering cartridge, comprising several filtering membranes which are arranged so as to be traversed parallel by the air which flows, considering the use of the same filtering material, considerably increases the filtering surface through which the air can pass, and thus the filtering surface on which the solid particles in suspension may accumulate, thus further increasing the life of the filtering cartridge specie.

Furthermore, the overall dimension of the filtering cartridge may however be limited, regardless the use of high airflows to be subjected to filtering.

A further aspect of the invention provides a filtering unit comprising an outer casing provided with at least one inlet and an outlet and a filtering cartridge, as described above, contained within the casing, so as to filter the fluid which flows from the inlet towards the outlet.

The filtering membrane is adapted to divide the internal volume of the casing in a first volume communicating with the inlet and a second volume communicating with the outlet.

BRIEF DESCRIPTION OF THE DRAWINGS

Further characteristics and advantages of the invention will be apparent from reading the following description provided by way of non-limiting example, with reference to the figures illustrated in the attached figures.

FIG. 2 is an axonometric view of a filtering cartridge according to an embodiment of the present invention.

FIG. 3 is a lateral view from III of FIG. 2.

FIG. 4 is the section IV-IV of FIG. 3.

FIG. 5 is the FIG. 4 without the filtering membrane.

FIG. 6 is a lateral view of the filtering unit of FIG. 1.

PREFERRED EMBODIMENT OF THE INVENTION

Figure 1:
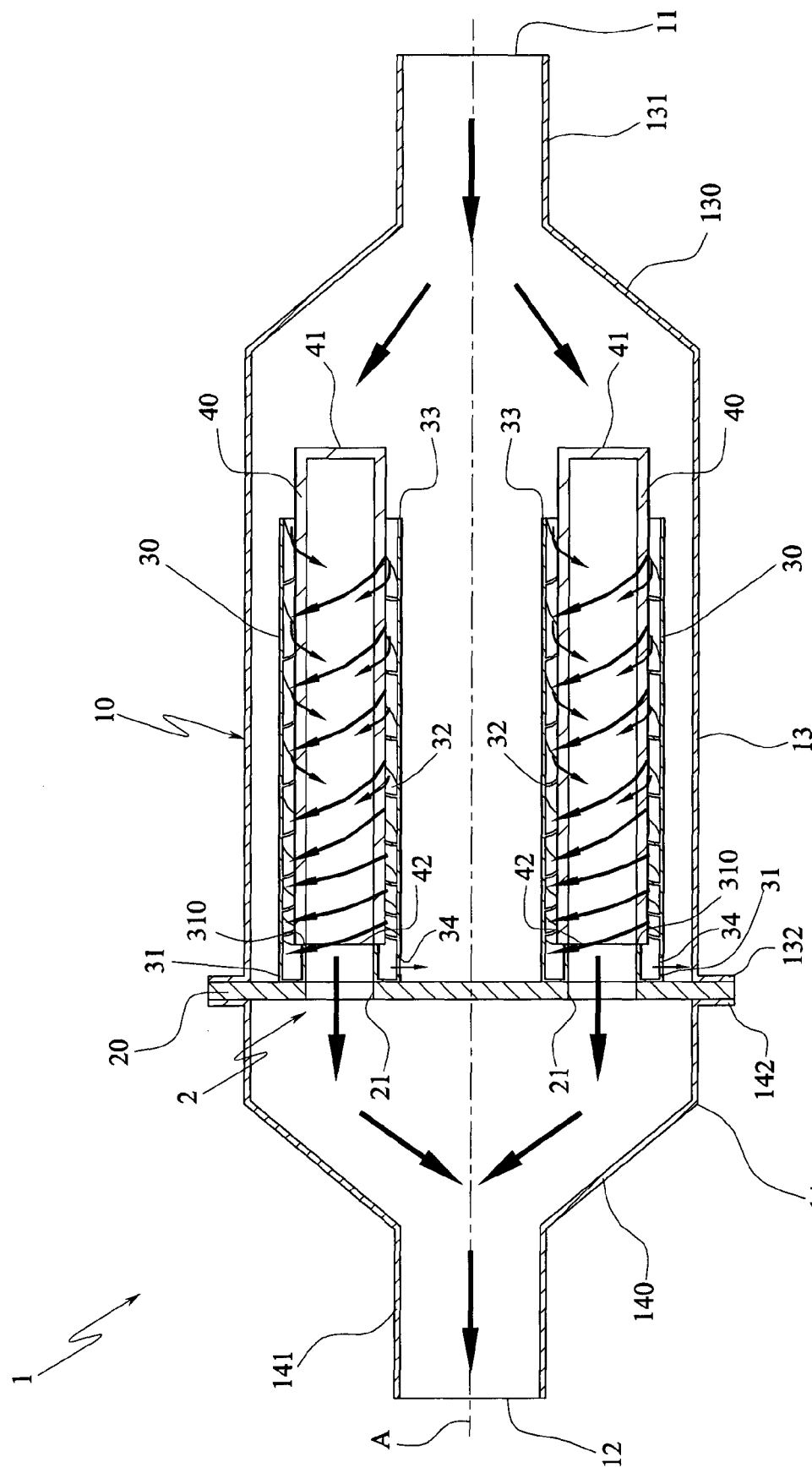
FIG. 1 is the section I-I of FIG. 6, regarding a filtering unit according to an embodiment of the present invention.

FIG. 1 shows a filtering unit 1, which is adapted to purify an airflow from the solid particles possibly present in suspension. More in particular, the filtering unit 1 is intended to be positioned along an intake conduit of un internal combustion engine, so as to filter the comburent air that is supplied within the combustion chambers of the engine.

The filtering unit 1 comprises an outer casing 10, conventionally referred to as filtering box, which can be provided globally made of plastic material. The outer casing 10 delimits an internal volume and it is provided with an inlet 11 for the air to be filtered and an outlet 12 for the filtered air, both communicating with said internal volume. The inlet 11 is intended to remain in communication with the external environment, while the outlet 12 is adapted to remain in communication with the engine combustion chambers, usually through an intake manifold.

The outer casing 10 is globally polyhedron-shaped, an extended polyhedron with longitudinal axis A in this case.

In this case, the outer casing 10 comprises a first body 13 substantially drinking-glass-shaped on whose bottom 130 (to the right in FIG. 1) there is provided a conduit 131 with central axis substantially parallel to the longitudinal axis A and defining the inlet 11.

The top part of the first body 13 comprises an edge 132 folded defining a surface substantially orthogonal to the lateral walls of the first body.

Furthermore, the outer casing 10, comprises a second body 14 also substantially drinking-glass-like on whose bottom 140 (on the left in FIG. 1) there is provided a conduit 141 with central axis substantially parallel to the longitudinal axis A and defining the outlet 12.

The top part of the second body 14 comprises an edge 142 folded defining a surface substantially orthogonal to the lateral walls of the first body.

The edge 142 of the second body 14 is adapted to face the edge 132 of the first body 13 for the substantially hermetic closure of the outer casing 10.

The outer casing 10 has a substantially quadrangular transverse section (square-shaped in the example), but it cannot be excluded that the section can be shaped differently, same case applying to the arrangement of the conduits 132 and 142 in the respective bodies which can be shaped differently depending on the construction needs.

The filtering unit 1 comprises a filtering cartridge, indicated in its entirety with 2, adapted to be mounted within the casing 10.

As illustrated in FIGS. 2-4, the filtering cartridge 2 comprises a substantially flat support flange 20 provided with a plurality of through openings 21, 5 in this case arranged to form a quincunx.

The filtering cartridge 2 further comprises a plurality of substantially cylindrical tubular bodies 30.

A first end 31 of each of the tubular bodies 30 is associated to the support flange 20 at each of the through openings and coaxially with respect thereto. The support flange 20, with shape conjugated to the section—in plan view—of the outer casing 10, is adapted to be clamp-retained between the edge 132 of the first body 13 and the edge 142 of the second body 14, for example by interposing suitable sealing gaskets, so that the tubular bodies 30 are contained within the first body 13 i.e. facing towards the inlet 11.

In the embodiment shown in the figures, each tubular body 30 is fixed integrally to the support plate 20 for example through gluing or any other equivalent means, but it cannot be excluded that the tubular body 30 be removably associated to the support plate 2, for example through snap-coupling or bayonet-coupling means, known to a man skilled in the art.

At the first end 31 of each tubular body 30 there is an annular abutment 310 having an inner diameter smaller than the diameter of the tubular body and substantially equivalent to the diameter of the through openings 21, whose outer surface is intended to rest against the support flange 20, substantially contouring a through opening 21, for the substantially sealing connection between the tubular body 30 and the support flange.

In the preferred embodiment shown in the figures, each tubular body 30 comprises at least one fin 32 having helical development, which is extended over the entire longitudinal development of the tubular body 30, from the first end 31 and a second end 33 thereof, and it is derived from the internal wall thereof.

However, it is not excluded that the fin 32 extends over a limited portion of the longitudinal development of the tubular body 30, for example a portion proximal to the second end 33 thereof. The length of the portion in which the fin 32 develops is, for example, dimensioned depending on the flow rate in question in the filtering unit 1, on the sections for the passage of air available and on the desired performance (pressure drop caused by the fin 32, accumulation of solid particles removed from the air by the fin, etc. . . . ).

The fin 32 has a height (distance from the crest thereof to the internal wall of the tubular body 30) which at most is equivalent to the difference between the internal diameter of the tubular body and the diameter of the through opening 21.

Furthermore, the fin 32 has a variable pitch along the longitudinal axis of the tubular body 30, for example, it has a pitch continuously decreasing from the second end 33 towards the first end 31.

Furthermore, it cannot be excluded that the tubular body 30 be provided with a helical fin 32 (the illustrated example has 4 fins 32 that start from points angularly spaced from each other by 90° as observable in FIG. 2).

Furthermore, each tubular body 30 comprises at least one discharge gap 34 provided on the lateral wall of the tubular body 30 which is obtained at the first end 31.

The filtering cartridge 2 further comprises a plurality of filtering membranes 40, five in the example, tubular shaped, each of which has a closed end 41, for example through a closure plate or by pressing the same, and an open opposite end 42 which is adapted to face the support flange 2 at one of the openings 21.

In practice, each filtering membrane 40 is adapted to be coaxially fitted within a tubular body 30, so that the open end 42 thereof is moved to contact with inner face of the annular abutment 310.

In practice, each filtering membrane 40 is perfectly fitted within tubular body 30, so that the fins 32 touch the outer lateral surface of the filtering membrane.

In a first embodiment, shown in the figures, each filtering membrane 40 is fixed, for example by gluing the open end 42, to the abutment element 32.

In a second alternative embodiment, each filtering membrane 40 comprises, at the open end 42 an annular plate provided with sealing coupling means, known in the sector, adapted to be decoupled at corresponding coupling means made at the annular abutment 310.

In the preferred embodiment shown in the figures each tubular body 30 has a longitudinal development substantially smaller with respect to the longitudinal development of each filtering membrane 40, the closed end 41 of the filtering membrane 40 thus projects externally with respect to the tubular body.

However, it is not excluded that the tubular body 30 can have a length greater or equivalent to the length of the respective filtering membrane 40 and that the tubular bodies 30, as well as the filtering membranes 40 of the filtering cartridge 2, may have different lengths and or dimension with respect to each other.

Preferably, each filtering membrane 40 is obtained from non-woven fabric material made of mutually intertwined fibres, which can be provided through the melt blown process and using the polymeric type of fibre, for example made of polypropylene; the filtering membrane 40 can alternatively be of the pleated membrane type made of a non-woven fabric with fibres made of cellulose and/or polymeric material and/or fiberglass.

In the light of the description outlined above, the filtering unit 10 operates as follows.

All the air that flows from the inlet 11 towards the outlet 12 of the casing 10, is forced to axially enter into the interspace defined between each filtering membrane 40 and the respective tubular body 30 where, due to the fin 31, there is conferred a windmill-like rotary motion.

Due to the centrifuge force, the solid particles suspended in the air are separated from the air and they are collected by the fin 31 and carried towards the discharge gap 34, from which they drop for example due to gravity on the lower wall of the first body 13.

The air from which the most coarse solid particles were pre-separated is thus forced to pass through the filtering membrane 40 (traversing it from the external towards the internal), which completes the filtration thereof up to the desired degree and, through the through opening 21, it passes from the first body 13 to the second body 14 and, lastly, exits from the outer casing 10 through the outlet 12.

The invention thus conceived can be subjected to numerous modifications and variants all falling within the inventive concept.

Furthermore, all details can be replaced by other technically equivalent elements.

In practice, the materials used as well as the shake and contingent dimensions, may vary depending from the needs without departing from the scope of protection of the following claims.

The invention claimed is:

1. Filtering unit (1), comprising an outer casing (10) provided with at least one inlet (11) and an outlet (12) and a filtering cartridge (2) contained within the outer casing (10) so as to filter a fluid which flows from the at least one inlet (11) towards the outlet (12), the filtering cartridge (2) comprising at least one tubular-shaped filtering membrane (40), having a closed end (41) and an open opposite end (42) and at least one tubular body (30) into which said at least one filtering membrane (40) is fitted so as to be at least partly wound, the at least one tubular body (30) comprising:
   at least one fin (32) having helical development deriving from an internal wall of the at least one tubular body (30); and
   at least one discharge gap (34) on the lateral wall thereof.

2. The filtering unit (1) according to claim 1, wherein the at least one fin (32) has a height substantially equivalent to a difference between an inner diameter of the at least one tubular body (30) and an outer diameter of the at least one filtering membrane (40).

3. The filtering unit (1) according to claim 1, wherein the at least one fin (32) has a variable pitch along a longitudinal axis of the at least one tubular body (30).

4. The filtering unit (1) according to claim 1, wherein the at least one tubular body (30) comprises at least one annular abutment (310) adapted to be fixed to the open end (42) of the at least one filtering membrane (40) so as to divide the environment within the at least one filtering membrane (40) from an external environment thereby.

5. The filtering unit (1) according to claim 4, wherein the at least one annular abutment (310) is provided at an end (31) of the at least one tubular body (30).

6. The filtering unit (1) according to claim 1, further comprising a support element (20) provided with at least one through opening (21) to which the at least one tubular body (30) is coaxially associated.

7. The filtering unit (1) according to claim 6, wherein the at least one tubular body (30) is integrally fixed to the support element (20).

8. The filtering unit (1) according to claim 6, wherein the at least one tubular body (30) is removably associated to the support element (20) through a coupling member.

* * * * *